Figure 1:
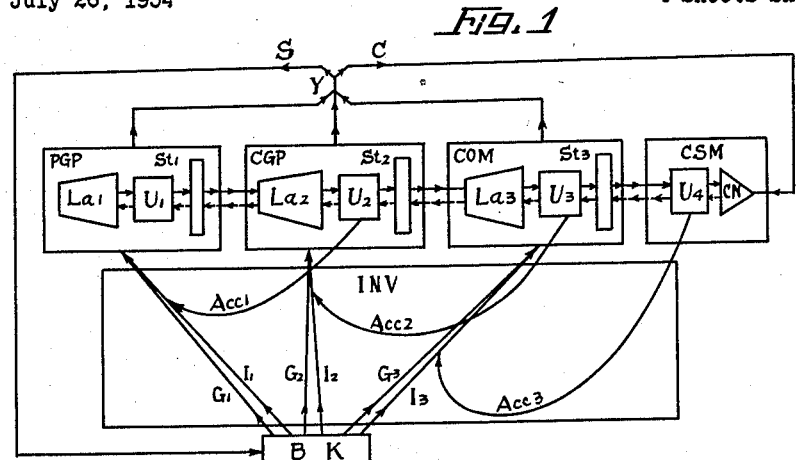

Dec. 8, 1959 YOSHIHARU MITA 2,916,212
ELECTRO-ANALOG MODEL EQUIPMENT OF NATIONAL ECONOMIC SYSTEM
Filed July 26, 1954 4 Sheets-Sheet 1

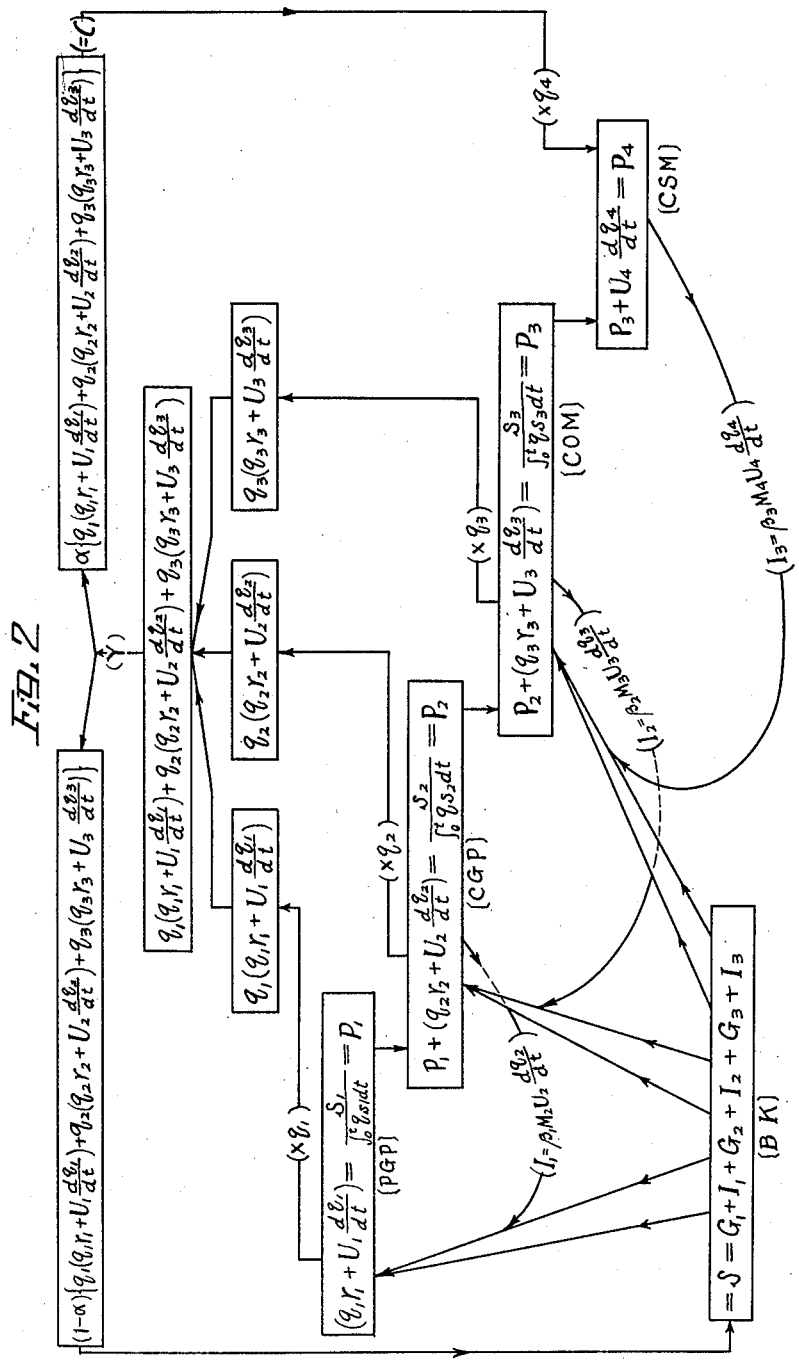

United States Patent Office 2,916,212
Patented Dec. 8, 1959

2,916,212

ELECTRO-ANALOG MODEL EQUIPMENT OF NATIONAL ECONOMIC SYSTEM

Yoshiharu Mita, Meguro-ku, Tokyo, Japan

Application July 26, 1954, Serial No. 445,590

Claims priority, application Japan November 24, 1953

10 Claims. (Cl. 235—184)

This invention relates to electro-analog model equipment for national economic systems, and more particularly to electric devices whose circuits are designed to bring about electric phenomena which are analogous with those in a national economy, the inter-relations and characteristics of the electrical components in such a circuit being arranged to be analogous with those of the economic elements because of which dynamic phenomena take place in the operation of the national economy.

National economic phenomena can be construed as processes of dynamic variations in economic quanta of the elements which are arranged under a national economic system and which are inter-related to each other. Recent research works in the field of theoretical economics have succeded in formulating such inter-relations mathematically in certain functional relationships.

However, it is still difficult to describe thereby what effects would result from variations in an economic quantum on all of the other economic quanta in a national economic system because of multitude of the economic elements and multiformity of the inter-relations therein established. Further difficulties lie in the investigation of problems relating to the effects resulting from variations in more than two economic quanta on all of the other economic quanta in a national economic system, because of the multitude and complexity of factors in the higher orders.

In addition, in the studies of such social phenomena as in national economy, few experimental processes are available for the investigation, contrariwise to natural-scientific studies.

These advantages stand as formidable obstacles against the applications of results obtained from theoretical economic studies for economic policies as well as against studies for further theoretical advancement.

A general picture of a national economic system can be represented in functional relationships mathematically based on the results obtained in recent studies in theoretical economics. Therefore, economic phenomena can be described electrically since electrical phenomena, which are analogous with economic phenomena in such functional relationships, are obtainable by means of electrical circuits.

This invention embodies principles whereby, with an electrical circuit, the components of which are arranged so that electrical quanta in such parts are varied in analogue with variations in quanta in the economic elements in consideration, the interlinking effects of various quantitative variations in the economic elements thereon can be described by means of such reading devices as voltmeters, current meters, oscilloscopes, recorders, etc. which are connected to such terminals in the electrical circuit as to develop variations in voltage or current which are analogous with those in the economic elements.

An object of this invention is to provide a device that functions in anologue with a national economic system, the electrical circuits of the device including electrical components whose characteristics are analogous to those of the economic elements in consideration and which are arranged and combined in analogue in such interlinking relationship as exists in the national economic system.

Another object of this invention is to provide a device capable of describing national economic phenomena under optional conditions by measuring what effects might be brought by quantitative dynamic variations in one or more such electro-analog components on the other remaining components with an analogue method.

A further object of this invention is to provide a device that may be useful for minimizing difficulties in theoretical descriptions of national economic phenomena and also for making preliminary or pilot experimentations for establishing national economic policies and for theoretical studies.

Figure 5:
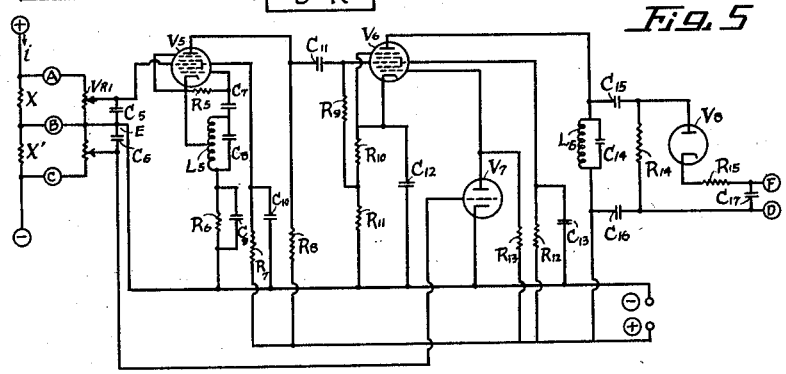
Figure 6:
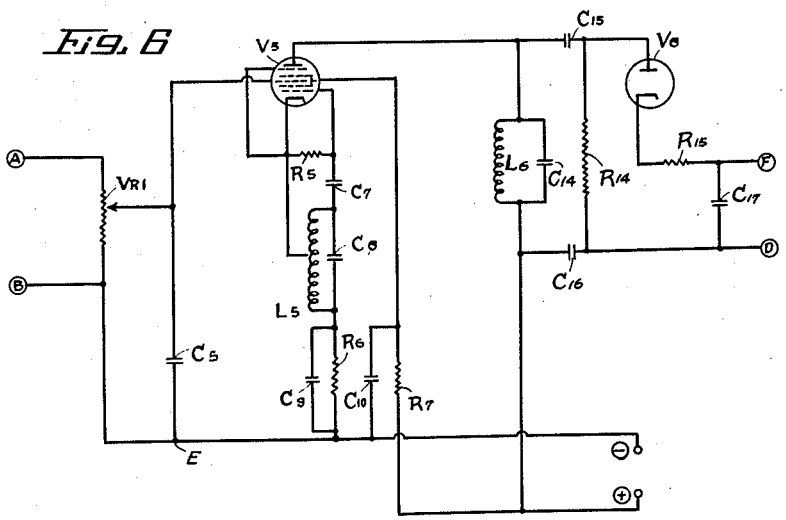
Figure 3:
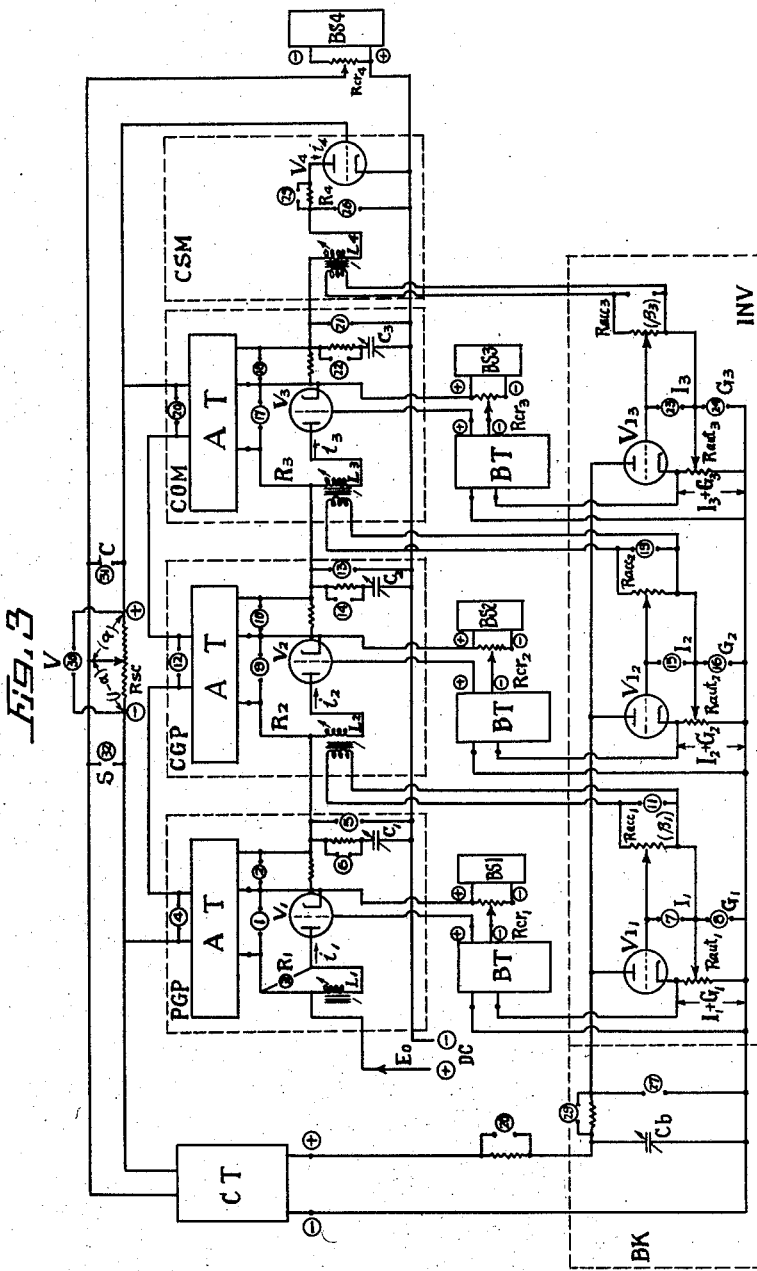
Figure 4:
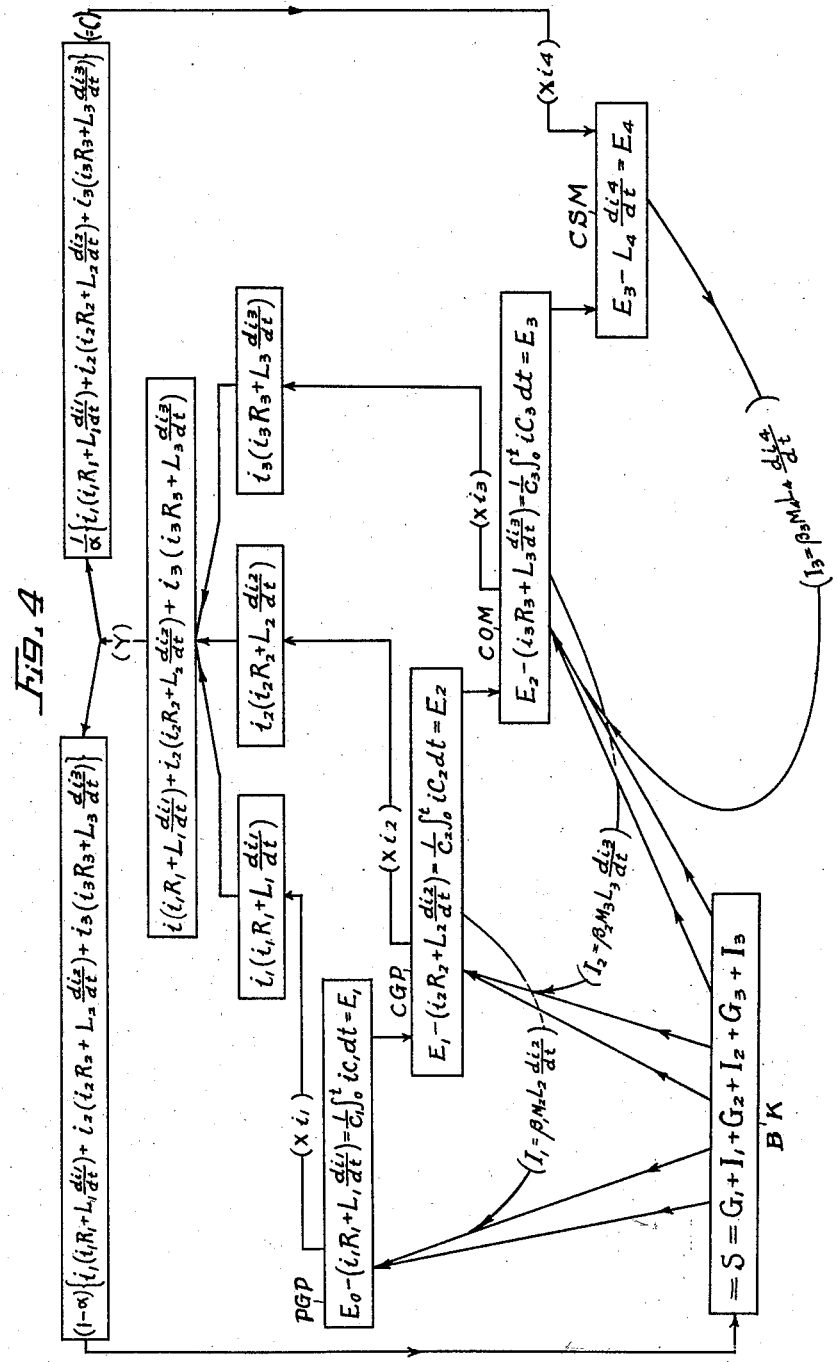

For a better understanding of this invention, reference is taken to the accompanying drawings, wherein Fig. 1 is a diagrammatic representation of a device for considering a national economic system showing the inter-relationships of economic elements thereof for investigation of dynamic phenomena therein; Fig. 2 is a diagram in which the dynamic inter-relationships in the economic system as shown in Fig. 1 are formulated mathematically in functional relationships; Fig. 3 is a connection diagram of an electro-analog device embodying this invention, by means of which dynamic inter-relationships in economic phenomena can be described with an electro-analog method; Fig. 4 is a diagram in which functional relationships between the elements of the circuit in Fig. 3 are formulated mathematically to prove, as will be understood, that the electrical circuit is constructed analogous with the national economic system with respect to the functions mathematically given in Fig. 2; Fig. 5 is a connection diagram of an insulated coupler which is included in the circuit given in Fig. 3, and Fig. 6 is a connection diagram of another type of insulated coupler which is also employed in this circuit.

An example of a general picture of national economic system, basing on which this invention can be embodied, is shown in Fig. 1 for which explanation is set forth below.

A national economic system can be construed in various ways as the point of view differs, but it can be outlined as shown in Fig. 1 when the problem is to investigate quantitative dynamic variations in a national economic system in the most simplified scheme. The general picture of a national economic system illustrated in Fig. 1 is based upon the theoretical explanations made by F. V. Hyake relating to the production structure and also those made by J. M. Keynes relating to the monetary structure of a national economic system, both of whom have leading positions in the field of theoretical economics.

As shown in Fig. 1, a national economic system can be construed as consisting of Capital Goods Production Group PGP, Consumer Goods Production Group CGP, Trading Group COM, Consumer Group CSM, Banking Organ BK and Investment Channels INV. The first three groups contain the productive labours $La_1$, $La_2$ and $La_3$, respectively, which are accompanied by an individual inertia property $U_1$, $U_2$ and $U_3$, and the stocks of goods $St_1$, $St_2$ and $St_3$ respectively, the goods being the products from the labours $La_1$, $La_2$ and $La_3$ respectively. The consumer group is represented as consisting of the consumption CN having an inertia property $U_4$.

The inter-connections of such labours, inertias and stocks in the productive groups (including the trading group) and the consuming group are shown in Fig. 1 by the dotted lines which represent monetary flow and by the solid lines which represent flow of goods. Incomes from the capital flow production group, consumer goods production group and trading group are aggregated into the national income Y, of which one part flows as indicated by the arrow S into the banking organ BK for saving and the other part flows as indicated by the arrow C into the consumer group CSM for consumption.

The saved part of national income is further directed into the channels of investments INV through the banking organ BK, and investments are directed into any of the productive groups PGP, CGP and COM in the forms of "Autonomous Investment" $G_1$, $G_2$ and $G_3$ and "Induced Investment" $I_1$, $I_2$ and $I_3$ respectively. Magnitudes of the induced investments $I_1$, $I_2$ and $I_3$ are influenced by the acceleration effects $Acc_1$, $Acc_2$ and $Acc_3$ respectively, which cause a magnified change in the rate of demand for goods being produced in earlier productive stages when a change in the rate of demand for the goods being produced in a productive stage takes place.

Such functions as set out above may be clarified furthermore by the detail explanations which will be hereinafter described with reference to Fig. 3.

The dynamic interrelationships between the economic elements, which, by way of example, constitute the national economic system, can be formulated in such functional relationships as are mathematically set out in Fig. 2 from the macro-economic point of view.

It is an essential basis of this invention that dynamic experimentations and measurements on national economic phenomena can be made by means of an electrical circuit in which electrical phenomena, which are analogous to those in the functional relationships in Fig. 2, are obtainable. Referring to the national economic system mentioned in Fig. 1 for example, it can be shown that the operation of an electrical circuit such as shown in Fig. 3 results in electrical phenomena which can be expressed as the functional relationships set out in Fig. 4, which stand for those in Fig. 2 completely in analogue. Therefore, it can be understood that, under optional conditions, the description of effects, which should be brought about by quantitative dynamic variations in one or more economic elements, on the others, of which such a national economic system as shown as in Fig. 1 consists, can be made by means of an electrical circuit such as shown in Fig. 3 and by the measuring of analogous effects which should be caused by similar quantitative dynamic variations in the electro-analog components, of which the electrical circuit consists, of dynamic variations in voltage or current.

The analogous relationships for the corresponding economic and electrical items are given in Table 1 with respect to the symbols used in Figs. 1, 2, 3 and 4.

TABLE 1

| Item | Economic Item | | Electrical Item | |
|---|---|---|---|---|
| | Symbol | Subject | Symbol | Subject |
| (0) | | | $E_0$ | (Supply voltage). |
| (1) | $q_1$ | Rate of change in flow of capital goods, §1 | $i_1$ | Current standing for $q_1$. |
| (2) | $r_1$ | Resistivity or marginal cost against capital goods production. | $R_1$ | Resistance standing for $r_1$. |
| (3) | $U_1$ | Inertia in capital goods production. | $L_1$ | Inductance standing for $U_1$. |
| (4) | $q_1 r_1$ | Unit production cost level of capital goods. | $i_1 R_1$ | Voltage standing for $q_1 r_1$. |
| (5) | $U_1 \frac{dq_1}{dt}$ | Unit profit level in capital goods production. | $L_1 \frac{di_1}{dt}$ | Voltage standing for $U_1 \frac{dq_1}{dt}$. |
| (6) | $q_1 r_1 + U_1 \frac{dq_1}{dt} = P_1$ | Unit price level of capital goods. | $E_0 - \left( i_1 R_1 + L_1 \frac{di_1}{dt} \right) = E_1$ | Voltage standing for $P_1$ in reciprocal order. |
| (7) | $S_1$ | Inflexibility of stock of capital goods. | $C_1$ | Capacitance standing for $S_1$. |
| (8) | $qs_1$ | Flows in and from stock of capital goods, §2. | $ic_1$ | Current standing for $qs_1$. |
| (9) | $\int_0^t qs_1 dt$ | Amount of capital goods in stock at the time $t$. | $\int_0^t ic_1 dt$ | Charge standing for $\int_0^t qs_1 dt$. |
| (10) | $\frac{1}{S_1}\int_0^t qs_1 dt = \frac{1}{P_1}$ | In dynamic equilibrium with (6). | $\frac{1}{C_1}\int_0^t ic_1 dt = E_1$ | In dynamic equilibrium with (6). |
| (11) | $q_1 \left( q_1 r_1 + U_1 \frac{dq_1}{dt} \right)$ | Rate of change in income from capital goods production, §3. | $i_1 \left( i_1 R_1 + L_1 \times \frac{di_1}{dt} \right)$ | Power standing for $q_1 \left( q_1 r_1 + U_1 \frac{dq_1}{dt} \right)$. |
| (12) | $q_2$ | Same as in (1) but regarding consumer goods. | $i_2$ | Current standing for $q_2$. |
| (13) | $r_2$ | Same as in (2) but regarding consumer goods. | $R_2$ | Resistance standing for $r_2$. |
| (14) | $U_2$ | Same as in (3) but regarding consumer goods. | $L_2$ | Inductance standing for $U_2$. |
| (15) | $q_2 r_2$ | Same as in (4) but regarding consumer goods. | $i_2 R_2$ | Voltage standing for $q_2 r_2$. |
| (16) | $U_2 \frac{dq_2}{dt}$ | Same as in (5) but regarding consumer goods. | $L_2 \frac{di_2}{dt}$ | Voltage standing for $U_2 \frac{dq_2}{dt}$. |
| (17) | $P_1 + \left( q_2 r_2 + U_2 \frac{dq_2}{dt} \right) = P_2$ | Same as in (6) but regarding consumer goods. | $E_1 - \left( i_2 R_2 + L_2 \frac{di_2}{dt} \right) = E_2$ | Voltage standing for $P_2$ in reciprocal order. |
| (18) | $S_2$ | Same as in (7) but regarding consumer goods. | $C_2$ | Capacitance standing for $S_2$. |
| (19) | $qs_2$ | Same as in (8) but regarding consumer goods. | $ic_2$ | Current standing for $qs_2$. |
| (20) | $\int_0^t qs_2 dt$ | Same as in (9) but regarding consumer goods. | $\int_0^t ic_2 dt$ | Charge standing for $\int_0^t qs_2 dt$. |
| (21) | $\frac{1}{S_2}\int_0^t qs_2 dt = \frac{1}{P_2}$ | In dynamic equilibrium with (17). | $\frac{1}{C_2}\int_0^t ic_2 dt = E_2$ | In dynamic equilibrium with (17). |
| (22) | $q_2 \left( q_2 r_2 + U_2 \frac{dq_2}{dt} \right)$ | Same as in (11) but regarding consumer goods. | $i_2 \left( i_2 R_2 + L_2 \frac{dq_2}{dt} \right)$ | Power standing for $q_2 \left( q_2 r_2 + U_2 \frac{dq_2}{dt} \right)$. |
| (23) | $q_3$ | Same as in (1) but regarding consumer goods being handled by trading group. | $i_3$ | Current standing for $q_3$. |
| (24) | $r_3$ | Same as in (2) but regarding consumer goods being handled by trading group. | $R_3$ | Resistance standing for $r_3$. |
| (25) | $U_3$ | Same as in (3) but regarding consumer goods being handled by trading group. | $L_3$ | Inductance standing for $U_3$. |
| (26) | $q_3 r_3$ | Same as in (4) but regarding consumer goods being handled by trading group. | $i_3 R_3$ | Voltage standing for $q_3 r_3$. |
| (27) | $U_3 \frac{dq_3}{dt}$ | Same as in (5) but regarding consumer goods being handled by trading group. | $L_3 \frac{di_3}{dt}$ | Voltage standing for $U_3 \frac{dq_3}{dt}$. |

TABLE 1—Continued

| Item | Economic Item | | Electrical Item | |
|---|---|---|---|---|
| | Symbol | Subject | Symbol | Subject |
| (28) | $P_2 + \left(q_3 r_3 + U_3 \dfrac{dq_3}{dt}\right) = P_3$ | Same as in (6) but regarding consumer goods being handled by trading group. | $E_2 - \left(i_3 R_3 + L_3 \dfrac{di_3}{dt}\right) = E_3$ | Voltage standing for $P_3$ in reciprocal order. |
| (29) | $S_3$ | Same as in (7) but regarding consumer goods being handled by trading group. | $C_3$ | Capacity standing for $S_3$. |
| (30) | $qs_3$ | Same as in (8) but regarding consumer goods being handled by trading group. | $i_{C_3}$ | Current standing for $qs_3$. |
| (31) | $\int_0^t qs_3 dt$ | Same as in (9) but regarding consumer goods being handled by trading group. | $\int_0^t i_{C_3} dt$ | Charge standing for $\int_0^t qs_3 dt$. |
| (32) | $\dfrac{1}{S_3}\int_0^t qs_3 dt = \dfrac{1}{P_3}$ | In dynamic equilibrium with (28). | $\dfrac{1}{C_3}\int_0^t i_{C_3} dt = E_3$ | In dynamic equilibrium with (28). |
| (33) | $q_3\left(q_3 r_3 + U_3 \dfrac{dq_3}{dt}\right)$ | Same as in (11) but regarding consumer goods being handled by trading group. | $i_3\left(i_3 R_3 + L_3 \times \dfrac{di_3}{dt}\right)$ | Power standing for $q_3\left(q_3 r_3 + U_3 \dfrac{dq_3}{dt}\right)$. |
| (34) | $q_4$ | Rate of change in flow of goods to consumption. | $i_4$ | Current standing for $q_4$. |
| (35) | $r_4$ | Resistivity against consumption. | $R_4$ | Resistance standing for $r_4$. |
| (36) | $U_4$ | Inertia in demand. | $L_4$ | Inductance standing for $U_4$. |
| (37) | $P_3 + U_4 \dfrac{dq_4}{dt} = q_4 r_4 = P_4$ | Consumption price level. | $E_3 - L_4 \dfrac{di_4}{dt} = i_4 R_4 = E_4$ | Voltage standing for $P_4$ in reciprocal order. |
| (38) | $q_4^2 r_4$ | Rate of change in consumption § 4. | $i_4^2 R_4$ | Power standing for $q_4^2 r_4$ in reciprocal order. |
| (39) | $(11)+(22)+(33)=Y$ | Rate of change in national income, § 5. | $(11)+(22)+(33)=Y$ | Power standing for $Y$. |
| (40) | $\alpha\{(11)+(22)+(33)\}$ | Rate in change in consumption, § 6. | $\alpha\{(11)+(22)+(33)\}$ | Power standing for $\alpha Y$. |
| (41) | $(1-\alpha)\{(11)+(22)+(33)\}$ | Rate of change in saving, §7. | $(1-\alpha)\{(11)+(22)+(33)\}$ | Power standing for $(1-\alpha)Y$. |
| (42) | $B$ | Capacity of banking organ. | $C_b$ | Capacity standing for $B$. |
| (43) | $\dfrac{1}{B}\int_0^t q_b dt = \dfrac{1}{\gamma}$ | Reciprocal of rate of interest. | $\dfrac{1}{C_b}\int_0^t i_{C_b} dt = E_\gamma$ | Voltage standing for rate of interest in reciprocal order. |
| (44) | $q_b$ | Monetary flow in or from $B$. | $i_{C_b}$ | Current standing for $q_b$. |
| (45) | $\beta_1$ | Acceleration in inducing investment directed to capital goods production. | $\beta_1$ | To be set by $Racc_1$. |
| (46) | $\beta_1\left(M_2 U_2 \dfrac{dq}{dt} dt\right) = I_1$ | Induced investment directed to capital goods production. | $\beta_1\left(M_2 L_2 \dfrac{di_2}{dt}\right) = E_g V_1$ | Grid voltage to $V_1$ standing for $I_1$. |
| (47) | $\beta_2$ | Acceleration in inducing investment directed to consumer goods production. | $\beta_2$ | To be set by $Racc_2$. |
| (48) | $\beta_2\left(M_3 U_3 \dfrac{dq_3}{dt}\right) = I_2$ | Induced investment directed to consumer goods production. | $\beta_2\left(M_3 L_3 \dfrac{di_3}{dt}\right) = E_g V_2$ | Grid voltage to $V_2$ standing for $I_2$. |
| (49) | $\beta_3$ | Acceleration in inducing investment directed to trading group. | $\beta_3$ | To be set by $Racc_3$. |
| (50) | $\beta_3\left(M_4 U_4 \dfrac{dq_4}{dt}\right) = I_3$ | Induced investment directed to trading group. | $\beta_3\left(M_4 L_4 \dfrac{dq_4}{dt}\right) = E_g V_3$ | Grid voltage to $V_3$ standing for $I_3$. |
| (51) | $G_1$ | Autonomous investment directed to capital goods production. | $EG_1$ | To be set by $Raut_1$. |
| (52) | $G_2$ | Autonomous investment directed to consumer goods production. | $EG_2$ | To be set by $Raut_2$. |
| (53) | $G_3$ | Autonomous investment directed to trading group. | $EG_3$ | To be set by $Raut_3$. |

*Notes*

§ 1. $q$ is $\dfrac{dQ}{dt}$, where $Q$ is amount produced. Same as to (12), (23) and (34).

§ 2. $qs$ is $\dfrac{dQ_s}{dt}$, where $Q_s$ is amount in stock. Same as to (19) and (30).

§ 3. $q\left(qr + L\dfrac{dq}{dt}\right)$ is $\dfrac{dy}{dt}$, where $y$ is amount of income, same as to (22) and (33).

§ 4. $q_4^2 r_4$ is $\dfrac{dC}{dt}$, where $C$ is amount of consumption.

§ 5. Means $\dfrac{dy}{dt}$.

§ 6. Means $\alpha\dfrac{dy}{dt}$, where $\alpha$ is propensity to consume.

§ 7. Means $(1-\alpha)\dfrac{dy}{dt}$.

8. At a state of equilibrium, $i_1$, $i_2$, $i_3$ and $i_4$ become equal each other.

9. At a state of equilibrium, $L\dfrac{di}{dt}$ is zero.

10. In Figure 3, it is to be understood that goods and moneys flow in opposite directions from each other.

Fig. 3 is a connection diagram, by way of example, of an electrical circuit embodying this invention and the electrical functions of this circuit can be formulated mathematically as shown in Fig. 4. Analogous relationships between Figs. 1 and 2 and Figs. 3 and 4 will be understood more clearly by referring to the itemized collations in Table 1 and the explanations which will appear later with respect to Fig. 3.

The electrical circuit shown in Fig. 3 is so arranged and connected as to have functions analogous with the economic system given in Fig. 1. The main electrical circuit consists of a multistage direct current circuit, each of the stages being composed of a resistance, an inductance and a capacitance and mediated by the capacitance. A direct current voltage is supplied to the input terminal D.C. and the circuit is loaded with the resistance $R_4$. The first stage in view of the terminals D.C. which consists of the resistance $R_1$, inductance $L_1$ and capacitance $C_1$, stands for the capital goods production group PGP; the second stage consisting of the resistance $R_2$, inductance $L_2$ and capacitance $C_2$ stands for the consumer goods production group CGP; the third stage consisting of the resistance $R_3$, inductance $L_3$ and capacitance $C_3$ stands for the trading group COM; and the last stage consisting of the resistance $R_4$ and inductance $L_4$ stands for the consumer group CSM and terminates this circuit. $V_1$, $V_2$, $V_3$ and $V_4$ are vacuum tubes which belong to the said stages respectively and their direct current anode resistances are operated as the resistances $R_1$, $R_2$, $R_3$ and $R_4$ respectively. The resistances $R_1$, $R_2$ and $R_3$ stand for the resistivities which take place against the productive labours (including both human and mechanical labours) in the respective stages. (As generally noted, resistance there is against any labours at work, and in an inverse sense, the labour can be defined as the overcoming of such a resistance. The overcoming of such a resistance, or disposal of labours, requires an expense, and a greater resistance requires more expense.) Such a productive labour is accompanied by an inertia, and the inductances $L_1$, $L_2$ and $L_3$ stand for such an inertia property in the respective stages. (A greater inertia results in more time elapsing in changing the volume of the production.) The capacitances $C_1$, $C_2$ and $C_3$ stand for the inventory functions for the goods produced or handled in the respective stages. (A greater capacitance or inflexibility of stocks results in a greater stability in the level of the supplies as well as prices thereof against a sudden change in level of the demand or production.) Further explanation of the functions in each stage is made in the following.

(A) *Functions of the $R_1$—$L_1$—$C_1$ circuit standing for the capital goods production group PGP*

The resistance $R_1$ stands for the resistance against the labour or marginal cost of producing capital goods and the electric current $i_1$ represents the rate of change in the flow of capital goods, the voltage drop $i_1R_1$ standing for the unit production cost for the capital goods. The rate of change in the flow of capital goods, which appears in this illustration, means $$\frac{dQ_1}{dt}$$

where $Q_1$ is the amount of capital goods produced or contrariwise $$Q_1 = \int_0^t i_1 dt$$

Therefore the rate of change in the total cost for such production is expressed by $i_1(i_1R_1)$ and the sum of cost in a certain period is represented by $$\int_0^t (i_1^2 R_1) dt$$

which constitutes majority of the income from such production. The capacitance $C_1$ stands for the inflexibility of the stock of capital goods, and the charging or discharging current $i_{C_1}$ to or from the capacitance $C_1$ represents the rate of change in the flow of capital goods to or from the stock, which influences the amount of capital goods in stock, viz.

$$i_{C_1} = \frac{dQ_{c_1}}{dt}$$

where $Q_{c_1}$ is the amount in stock or contrariwise $$Q_{c_1} = \int_0^t i_{c_1} dt$$

In addition, it is understood in our modern economy that price of goods is a function of the amount of the goods in stock and a determinant for the functional relationship is the inflexibility of the stock. Therefore, the price level of capital goods $P_1$ can be represented by a functional relationship such as $$P_1 = \frac{S_1}{\int_0^t s_1 dt}$$

and the analogous relationship between $P_1$ and $E_1$ is established in reciprocal order viz.

$$P_1 = \frac{1}{E_1}$$

or vise versa, as the voltage $E_1$ being developed across terminals of the capacitance $C_1$ is in such a functional relationship as $$E_1 = \frac{1}{C_1} \int_0^t i_{c_1} dt$$

In an equilibrium state, where $$L_1 \frac{di_1}{dt} = 0$$

and $i_{C_1} = 0$ at the same time ($E_0 - i_1R_1$), where $E_0$ is the power supply voltage to the terminals D.C., becomes equal to the voltage across terminals of the capacitance $C_1$, or $E_0 - i_1R_1 = E_1$, and this stands for the price level of capital goods in reciprocal order or for $1/P_1$.

Assuming now that the load on the $R_1$—$L_1$—$C_1$ stage presented by the following $R_2$—$L_2$—$C_2$ stage, which stands for the consumer goods production group CGP, becomes heavy suddenly for some reason, or that the demand for capital goods by the consumer goods production group CGP are increased suddenly for some reason, then the initial increase in the current to the $R_2$—$L_2$—$C_2$ circuit takes place under the favour of the capacitance $C_1$ because the two circuits are mediated by the capacitance $C_1$ which stands for the stock function for the capital goods, and no sufficient increase in the current through the resistance $R_1$ can take place until a certain time elapses according to the magnitude of momentum due to the inductance $L_1$, viz. an instantaneous increase in the production of capital goods is restrained by the momentum due to the production inertia $U_1$, and the supply of capital goods to meet the increased demand is made under the favour of the stock $Q_{s_1}$ until the production be raised sufficiently.

The capacitance $C_1$ is so large that while undertaking the supply of the increment in the flow of capital goods to the consumer goods production group CGP, no sudden change in the voltage across terminals of the capacitance $C_1$ takes place, viz. no suddent change in the price level of the capital goods takes place.

However, as the charge in the capacitance $C_1$ decreases, viz. the stock of capital goods decreases, a voltage $$L_1 \frac{di_1}{dt}$$

is induced in the inductance $L_1$ and until the current $i_1$ increases sufficiently such an induced voltage complements the lack of equilibrium between ($E_0 - i_1R_1$) and $E_1$, viz. the pricewise lack of equilibrium between the supply and demand is complemented with such an inducement.

Such an equilibrium relationship can be expressed by such an equation as $$E_1 = E_0 - \left(i_1R_1 + L_1\frac{di_1}{dt}\right)$$

and it can be understood that $E_1$ is reduced while the current $i_1$ does not increase sufficiently because of the momentum due to the inductance $L_1$, as compared with the level at an equilibrium where the load against the $R_1$—$L_1$—$C_1$ circuit has not yet become heavy, viz. until the production of capital goods meets such an increase in demand, the price level of capital goods goes up, and it can be seen that $$L_1 \frac{di_1}{dt}$$

stands for an income which is more than the production cost, or for a profit. However, if no change takes place in the value of the resistance $R_1$, the voltage $E_1$ decreases as $E_1 = E_0 - i_1 R_1$ when the induced voltage $$L_1 \frac{di_1}{dt}$$

has faded out and the current $i_1$ has been increased sufficiently under a new equilibirium state. (In the theoretical economics, it is so understood that price becomes equal to production cost under an equilibrium state.)

Such lower value of the voltage $E_1$ or such higher price level is the result of driving up production without any additional investment in production facilities, while it is necessary to make such an investment in order to carry out an economical production. Such an additional investment results in an increase in production facilities such as labour, machine, etc. which enables the production to meet the increment in demand, and, therefore, such an investment is nothing other than a process of decreasing resistance against the production.

Thus, the investment can be construed as bringing about a decrease in the resistance $R_1$ in the analogous illustration. In a case where value of the resistance $R_1$ is decreased, it is easy to increase the current $i_1$ without considerable rise in the value of $i_1 R_1$, viz. in a case where a suitable investment is made, the production of capital goods can be increased without a considerable rise in the production cost and in the price level thereof.

Controls of the resistance $R_1$, or investment functions on the capital goods production, are made through the circuit consisting of the vacuum tube $V_{I_1}$, which stands for the investment channel directed to the capital goods production group PGP, by varying the grid voltage being applied to the vacuum tube $V_1$. In the case where the load on the $R_1$—$L_1$—$C_1$ circuit presented by the $R_2$—$L_2$—$C_2$ circuit suddenly becomes light, there takes place in general a phenomenon contrary to as indicated above. In this case, value of $$L_1 \frac{di_1}{dt}$$

becomes negative, viz. this stands for a negative profit or loss; the charge in the capacitor $C_1$ increases and the voltage $E_1$ increases, viz. the stock of capital goods increases and the price level goes down; the current $i_1$ decreases and thus the voltage drop $i_1 R_1$ in the resistance $R_1$ decreases, viz. the rate of change in the flow of capital goods decreases and income from the capital goods production group as well as the production cost falls down.

The dynamic changes as in the above, appear in various different forms and phases according to values of the resistance $R_1$, inductance $L_1$ and capacitance $C_1$, and this means that various different dynamic phenomena take place in their forms and phases as values of the resistance against labours, accompanying inertia and scope of stock differ respectively.

(B) *Functions of the $R_2$—$L_2$—$C_2$ and $R_3$—$L_3$—$C_3$ circuits standing for the consumer goods production group CGP and the trading group COM respectively*

The two stages, consisting of the $R_2$—$L_2$—$C_2$ and $R_3$—$L_3$—$C_3$ circuits respectively, which follow the first stage consisting of the $R_1$—$L_1$—$C_1$ circuit representing the capital goods production group PGP, stand for the consumer goods production group CGP and the trading group COM respectively, and their circuit connections and functionse are the same as in the $R_1$—$L_1$—$C_1$ circuit. As for the relationship of the values of the goods which are produced or handled in these three successive stages, there is an additional relationship, viz. the price level of consumer goods (the reciprocal of the voltage across terminals of the capacitance $C_2$) is indicated by the sum of the price level of capital goods and the level of unit income from the consumer goods production (the sum of unit production cost for consumer goods and unit profit or loss therein) and this can be formulated as follows in an electro-analog equation.

$$E_1 - \left(i_2 R_2 + L_2 \frac{di_2}{dt}\right) = \frac{1}{C_2}\int_0^t i_{C_2} dt = E_2$$

The price level of the consumer goods being supplied through the trading group is counted in the same way as in the above, viz.

$$E_2 - \left(i_3 R_3 + L_3 \frac{di_3}{dt}\right) = \frac{1}{C_3}\int_0^t i_{C_3} dt = E_3$$

These relationship are to be construed as representing the inter-relationships of values appearing in F. V. Hyake's explanation with respect to the stepwise production structure.

In addition, the values of current $i_1$, $i_2$ and $i_3$ stand for the rates of changes in the flows of the consumer goods and those being handled through the trading group respectively, and the values all become equal along with the current $i_4$, of which illustration will be made later, when the whole system is in an equilibrium state.

(C) *Functions of the circuits for aggregating incomes and for diverting national income into consumption expenditure and saving*

$$iR + L\frac{di}{dt}$$

in each of the productive stages stands for unit income from each productive group, and $$i\left(iR + L\frac{di}{dt}\right)$$

in each stage represents total income therefrom, and the aggregation of every $$i\left(iR + L\frac{di}{dt}\right)$$

is regarded as forming the national income Y, viz.

$$i_1\left(i_1 R_1 + L_1 \frac{di_1}{dt}\right) + i_2\left(i_2 R_2 + L_2 \frac{di_2}{dt}\right) + i_3\left(i_3 R_3 + L_3 \frac{di_3}{dt}\right) = Y$$

As for the divergency of the national income Y into the consumption expenditure and saving, based on J. M. Keynes' theory, it is so regarded that one part of the national income Y is to be spent for buying the end products, which are the consumer goods being handled through the trading group after having been produced in the preceding productive stages and of which rate of change in the flow is represented by $i_4$, and the other part is to be saved; and the ratio of the part for the consumption C to the national income Y, or $C/Y$ is referred to as "propensity to consume" represented by $\alpha$, and the ratio of the part for the saving S to the national income Y, or $S/Y$ is referred to as "propensity to save," represented by $(1-\alpha)$.

(It should be noted, however, that the term "unit income," "total income" and "national income," which were used in the above and will be used hereinafter, should be construed as to represent "rate of change" in unit, total and national incomes respectively in the proper expression.)

The function of representing such divergency of the national income is carried out by the potentiometer Rsc, of which the variable characteristic is linear so that the propensity to consume or to save can be read directly on a dial with a linear calibration.

The multiplication $$i \times \left(iR + L\frac{di}{dt}\right)$$

in each productive stage is performed by an insulated coupler AT, of which circuit is shown in Fig. 5 (a description thereof will be made later) description will be made later, and the aggregation $$i_1\left(i_1 R_1 + L_1 \frac{di_1}{dt}\right) + i_2\left(i_2 R_2 + L_2 \frac{di_2}{dt}\right) + i_3\left(i_3 R_3 + L_3 \frac{di_3}{dt}\right)$$

is made through such insulated couplers which are provided in the $R_1$—$L_1$—$C_1$, $R_2$—$L_2$—$C_2$ and $R_3$—$L_3$—$C_3$ circuits individually. The main function of the insulated coupler AT is to perform the multiplication $$i \times \left(iR + L\frac{di}{dt}\right)$$

and it is designed so that application of a voltage which is proportional to the current $i$ and a voltage which is proportional to $$\left(iR + L\frac{di}{dt}\right)$$

to the primary circuit thereof produces at the secondary circuit thereof a voltage which is proportional, in a certain range, to the product of the two voltages being applied to the primary circuit.

In aggregating incomes from each productive stage through the insulating couplers, it is necessary to have direct current insulation between the primary and secondary circuits of each insulating coupler, because the main circuit of the system consists of a direct current circuit and without such insulation, shorts can occur in essential parts of the system, viz. it is necessary to arrange circuit so as to perform the aggregation of $$i_1\left(i_1R_1 + L_1\frac{di_1}{dt}\right) + i_2\left(i_2R_2 + L_2\frac{di_2}{dt}\right) + i_3\left(i_3R_3 + L_3\frac{di_3}{dt}\right)$$

and to divert the sum thereof by the potentiometer $Rsc$ into the two directions, one being to the grid circuit of the vacuum tube $V_4$ in the consumer group, the other being to the circuit BK representing the banking organ, without the occurrence of shorts among the $R_1$—$L_1$—$C_1$, $R_2$—$L_2$—$C_2$, $R_3$—$L_3$—$C_3$ and $R_4$—$L_4$ circuits, and such a performance is made by providing a direct current insulation between the primary and secondary circuits of the insulated coupler AT. Such requirements in the insulated coupler AT are fulfilled by employing a high frequency circuit as shown in Fig. 5 and a high frequency current is rectified so as to obtain a direct current output voltage at the secondary circuit thereof which is completely insulated from the primary circuit against direct current flow therefrom. Detailed explanation concerning the connections and components thereof will be given later.

(D) *Functions of the $L_4$—$R_4$ circuit standing for consumer group CSM*

The rate of consumption in a national economy can be expressed by the product of the national income $Y$ by the propensity to consume $\alpha$, or $\alpha Y$, and this can be formulated in the following electro-analog equation:

$$\alpha Y = \alpha \left\{ i_1\left(i_1R_1 + L_1\frac{di_1}{dt}\right) + i_2\left(i_2R_2 + L_2\frac{di_2}{dt}\right) + i_3\left(i_3R_3 + L_3\frac{di_3}{dt}\right) \right\}$$

and the design of the circuit is made so that the power consumption in the resistance $R_4$, which stand for the consumption function in the economic term, or $i_4^2 R_4$, is kept always equal to $\alpha Y$ being derived from the above equation but in the reciprocal order with respect to $\alpha$ or $$Y\frac{1}{\alpha} = i_4^2 R_4$$

This represents that the consumption expenditure in the national economy is equal in amount to the purchase of consumer's goods in a macro-economic view point.

The functional relation $$\frac{1}{\alpha}Y = i_4^2 R_4$$

is maintained in such a way that the grid potential of the vacuum tube $V_4$ is controlled by the voltage proportional to $\alpha Y$, which is diverted by the potentiometer $Rsc$, and in an equilibrium condition where $i_1$, $i_2$, $i_3$ and $i_4$ become equal to each other, such functional relation is to be in such a condition as follows:

$$\frac{1}{\alpha}i^2(R_1 + R_2 + R_3) = i^2 R_4$$

or $$\frac{1}{\alpha}i(R_1 + R_2 + R_3) = iR_4$$

or $$\frac{1}{\alpha}(R_1 + R_2 + R_3) = R_4$$

and this is the most essential condition for establishing the fundamental set-up for operating this electro-analog model equipment.

(E) *Functions of the $C_b$ circuit standing for the banking organ BK*

The voltage proportional to $(1-\alpha)Y$, which is diverted by the potentiometer $Rsc$, is applied to the capacitance $C_b$ through another type of the insulated coupler, CT. A function of the insulated coupler CT is to isolate the secondary circuit from the primary circuit against the direct current flow therefrom, but CT has no multiplying function such as in the insulated coupler AT and it functions to produce at the secondary circuit a voltage which is proportional to the voltage being applied to the primary circuit, and the output capacity of CT is designed to be somewhat larger than that of the insulated coupler AT in order to provide enough voltage for operating the vacuum tubes $V_{I_1}$, $V_{I_2}$ and $V_{I_3}$ which represent the investment channels, for which explanation will appear later. The direct current insulation between the primary and secondary circuits in the insulated coupler CT is not a matter indispensably required, but such a design associated therein is preferable in consideration of possible further extentions or modifications of the circuit for investigating various problems in economic dynamics in further steps. Illustration on an example design of such as insulated coupler will be made later referring to Fig. 6.

The capacitance $C_b$ stands for the function or scope of monetary stock, and the build-up of electrical charge therein stands for the monetary deposit in the banking organ BK, the supply for such charge being made by the voltage proportional to $(1-\alpha)Y$ through the insulated coupler CT, viz. the source for such deposit being the saved part in the national income. On the other hand, in the case where the current from the capacitance $C_b$ to the circuits consisting of the vacuum tubes $V_{I_1}$, $V_{I_2}$ and $V_{I_3}$ increases relative to the value of the capacitance $C_b$ as well as the supply thereto, the charge decreases and the potential across terminals of the capacitance $C_b$ consequently decreases. This represents that the amount of investments increases relative to the scope of the banking organ as well as saving, the deposit therein decreases and the rate of interest goes up. The voltage across terminals of the capacitance $C_b$ stands for the rate of interest in reciprocal order, viz. a rise in voltage stands for a fall in the rate of interest and vice versa.

A higher potential in the capacitance $C_b$ drives the more current into the circuits consisting of the vacuum tubes $V_{I_1}$, $V_{I_2}$ and $V_{I_3}$, and a lower potential decreases this current. The relationship represents that, in principle, the investment becomes active when the rate of interest is kept low and it becomes inactive under the higher rate of interest. Furthermore, more supply current is received by the capacitance $C_b$ when the voltage across terminals of the capacitance $C_b$ becomes lower than the supply voltage. This means that the higher rate of interest invites greater savings.

(F) Functions of the $V_{I1}$, $V_{I2}$ and $V_{I3}$ circuits standing for the investment channels The investments can be classified into two categories, from the macro-economic point of view, viz. "Induced" and "Autonomous."

The induced investment is the kind of investment that is induced by a change in demand during business cycles. The autonomous investment is the kind of investment that is made constantly according to the scale of economy itself. Both the autonomous investment and the induced investment are dependent on the savings or the part of national income which are not spent for buying consumer goods from the macro-economic view point, and at a stabilized condition of the national economy, current savings become equal to current investment or $S=G_1+I_1+G_2+I_2+G_3+I_3$. However, we can observe that a case may exist where a portion of current savings is hoarded so that current investment is less than current savings, or, on the contrary, current investment exceeds current savings, and, in the case where the unbalance between current savings and current investment is taken into consideration, the above equation must be rewritten as $S=\pm\Delta S+G_1+I_1+G_2+I_2+G_3+I_3$, where $+\Delta S$ indicates a portion being hoarded of current savings and $-\Delta S$ indicates investment depended on previously hoarded cash balance or money creation by banks.

However, it is generally true that an existence of $+\Delta S$ will tend to decrease national income and also rate of interest, and an existence of $-\Delta S$ will tend to increase national income and raise the rate of interest at the same time, so that the national economic system itself acts automatically so as to minimize the $\Delta S$ or to keep it zero with a minimum of time delay in any way.

In the present economic model as mathematically represented in Fig. 2, the existence of $\Delta S$ is disregarded in order to simplify the function of the model for the above reason, and in order to comply with the relevant equation shown on Fig. 4 in electrical terms, the type of the vacuum tubes $V_{I1}$, $V_{I2}$, $V_{I3}$ as well as value of the resistances $Raut_1$, $Raut_2$, $Raut_3$ shown in Fig. 3 are chosen and pre-adjusted so that the voltage representing $G_1+I_1+G_2+I_2+G_3+I_3$ will become equal to S at a stabilized condition or when a disequilibrium therebetween has faded away. However, in the case where it is desired to take the existence of $\Delta S$ into consideration, the relevant equation in Fig. 4 in electrical terms as well as in Fig. 2 in economic terms is to be read as $S=\pm\Delta S+G_1+I_1+G_2+I_2+G_3+I_3$, and measurement of dynamic variations in $\Delta S$ can be made by comparing variations in voltage developed through the terminal 28 with that through the terminal 29 indicated on Fig. 3.

As for the induced investment, it can be so understood that the incentive providing the inducement is an increase in profit due to an increase in demand relative to supply or production, viz. the inducement of $$U\frac{dq}{dt}, \text{ or } L\frac{di}{dt}$$

in electrical terms.

The positive $$U\frac{dq}{dt}$$

represents a profit and the negative one is to be understood as a loss, and the positive one induces an investment whereas the negative one discourages investment. Explanation of the functions of the circuit consisting of the vacuum tubes $V_{I1}$, $V_{I2}$ and $V_{I3}$ which represent the channels for the induced and/or discouraged investment, is as follows.

The main function of the circuit is to apply such individual voltages to the grids of the vacuum tubes $V_1$, $V_2$ and $V_3$ as are proportional to $$L_2\frac{di_2}{dt}, L_3\frac{di_3}{dt} \text{ and } L_4\frac{di_4}{dt}$$

respectively, the charge in capacitance $C_b$ being the source of power for the execution of this function. This represents an economic function whereby savings are turned into investments in accordance with the magnitude of the disequilibrium between supply and demand, and such a disequilibrium in the consumer group CSM induces an investment directed to the trading group COM, such a disequilibrium in the trading group induces an investment directed to the consumer goods production group CGP and such a disequilibrium in the consumer's goods production group CGP induces an investment directed to the capital goods producing group PGP.

The grid circuit of the vacuum tubes $V_1$, $V_2$ and $V_3$ are connected to the cathode circuits of the vacuum tubes $V_{I1}$, $V_{I2}$ and $V_{I3}$ respectively through the individual insulated couplers BT, and the grid circuits of the vacuum tubes $V_{I1}$, $V_{I2}$ and $V_{I3}$ are connected to the secondary windings of the inductances $L_2$, $L_3$ and $L_4$ respectively through the individual volume controls $Racc_1$, $Racc_2$ and $Racc_3$, the anode power to these vacuum tubes being supplied from the capacitance $C_b$ in common.

The insulated coupler BT has a similar design to that of AT and CT in isolating the secondary circuit from the primary circuit against the direct current flow therefrom, and it functions to produce such a voltage at the secondary circuit as is proportional to the voltage being applied to the primary circuit, but it does not have a multiplying function as in the insulated coupler AT and does not have a large output capacity as in the insulating coupler CT.

The fundamental design of the insulating coupler BT is similar to that of the insulated coupler CT and it produces a voltage which is just enough to control the grid voltage for the vacuum tubes $V_1$, $V_2$ and $V_3$.

The function of the circuit consisting of $V_{I1}$, $V_{I2}$ and $V_{I3}$ is explained in the following reference to an example of the operation in the $V_{I1}$ circuit.

As $$L_2\frac{di_2}{dt}$$

is induced, it is applied to the grid of the vacuum tube $V_{I1}$ through the volume control $Racc_1$, and this results in such a change in the voltage drop in the resistance $Raut_1$ that is proportional to $$L_2\frac{di_2}{dt}$$

and such a change in voltage is applied further to the grid of the vacuum tube $V_1$ through the insulated coupler BT in the same phase as of $$L_2\frac{di_2}{dt}$$

Therefore, the change in the voltage which is applied to the grid of the vacuum tube $V_1$ is a function of $$L_2\frac{di_2}{dt}$$

and also of the setting of the volume control $Racc_1$ and the potential in the capacitance $C_b$.

The same function as is executed in the $V_{I1}$ circuit is also executed in the $V_{I2}$ and $V_{I3}$ circuits, and this function represents that the investment directed to any of the productive stages are a function of the changes in the respective demands and also of the amount of saving, rate of interest and respective accelerations in inducing investments. The acceleration hereunder is to be understood as the magnification ratio of a change in the rate of change in demand to the change in the rate of change in investment induced thereby, and the accelerations directed to any of the productive stages can be adjusted by the individual volume controls $Racc_1$, $Racc_2$ and $Racc_3$ respectively.

As for the autonomous investment, it is so understood that the autonomous investments are also directed to the respective productive stages in addition to the induced investment, but without being influenced by the change in demands or $$U\frac{dq}{dt} \text{ or } L\frac{di}{dt}$$

The levels of the voltage $G_1$, $G_2$ and $G_3$, which stand for the levels of the autonomous investments respectively directed to the three productive groups, can be adjusted by the potentiometer $Raut_1$, $Raut_2$ and $Raut_3$, individually.

The biasing devices $BS_1$, $BS_2$, $BS_3$ and $BS_4$, which are provided in the grid circuits of the vacuum tubes $V_1$, $V_2$, $V_3$ and $V_4$ respectively, supply grid bias voltages to these vacuum tubes individually, and the potentiometers $Rcr_1$, $Rcr_2$, $Rcr_3$ and $Rcr_4$ are used for adjusting the bias suitably. Another reason for providing such potentiometers is as follows. Often we use such an assumption in processing theoretical analyses of economic phenomena, that "should the economic quantum vary for a certain reason, or for an exogenetic reason," we can describe its results on the other economic quanta. The potentiometers $Rcr_1$, $Rcr_2$, $Rcr_3$ and $Rcr_4$ enable us to provide such an assumption in investigating economic problems employing the present electroanalog model equipment, viz. the variations of voltage by such potentiometers can be used to represent variations into a disequilibrium state of such economic quanta as demand and supply, which are caused by an exogenetic ground independent from the self-governed functions of the economic system itself, because these biasing devices are independent and the adjustments are made independent from the self-governed inter-relationships of the whole circuits.

(G) *Examples of measurement operations*

The numerals 1 to 32, inclusive, noted in Fig. 3 indicate the positions of terminals, to any of which such a reading device as a meter, recorder, oscilloscope, etc. can be connected for measuring variations in voltage or current which stands for the economic quantum in problem. The economic items measurable by this equipment are as shown in Table 3.

The process of investigating problems in a national economy employing this equipment is as follows:

In describing the national economic phenomena on a certain theoretical basis, the proper features of the economic system and the autonomous functions thereof are considered as the premise for processing such theoretical descriptions. However, it should be also noted that there are several economic factors or elements which can be controlled artificially and economic policies are therefore possible.

Therefore, in designing the present electro-analog model equipment, it is necessary to have selected electro-analog components which stand for such economic items which are controllable artificially under the national economic system in consideration. As for the properties of economic phenomena which reveal themselves necessarily under a national economic system, it might be so understood that they are derived substantially from the properties of the economic system itself as well as those of human actions in the economic lives, and as for the artificially controllable items, it might be so understood that they are "effectuating quantum" in the inter-relationships of economic elements.

Such artificially controllable items being considered in the design of this equipment are shown in Table 2, and it is so designed that any of values of the components in Table 2 are adjustable manually.

TABLE 2

|  | Capital Goods Production Group (PGP) | Consumer Goods Production Group (CGP) | Trading Group (COM) | Consuming Group (CSM) |
|---|---|---|---|---|
| Inertia | $L_1$ | $L_2$ | $L_3$ | $L_4$. |
| Inflexibility of stock | $C_1$ | $C_2$ | $C_3$ |  |
| Acceleration in inducing investment | $Racc_1$ | $Racc_2$ | $Racc_3$ |  |
| Autonomous investment | $Raut_1$ | $Raut_2$ | $Raut_3$ |  |
| Assumption | $Rcr_1$ | $Rcr_2$ | $Rcr_3$ | $Rcr_4$. |

| Capacity Organ (BK) | | National Income (Y) | |
|---|---|---|---|
| Scope of capacity | $C_b$ | Propensity to consume, propensity to save. | $Rsc$. |

The main items which can be measured by this equipment are as shown in Table 3 and any of such items can be observed or recorded by connecting such a reading device as meter, recorder, oscilloscope, etc. to the corresponding terminals, of which indications are also given in Table 3, as a dynamic variation in the electro-analog quantum.

TABLE 3

| Capital Goods Production Group (PGP) | | Consumer Goods Production Group (CGP) | | Trading Group (COM) | | Consumer Group (CSM) | |
|---|---|---|---|---|---|---|---|
| Item | Terminal | Item | Terminal | Item | Terminal | Item | Terminal |
| Level of unit production cost ($i_1R_1$) | (1) | Level of unit production cost ($i_2R_2$) | (9) | Level of unit production cost ($i_3R_3$) | (17) | Rate of change in flow of goods ($i_4$) | (25) |
| Rate of change in flow of goods ($i_1$) | (2) | Rate of change in flow of goods ($i_2$) | (10) | Rate of change in flow of goods ($i_3$) | (18) |  |  |
| Level of unit profit $\left(L_1\frac{di_1}{dt}\right)$ | (3) | Level of unit profit $\left(L_2\frac{di_2}{dt}\right)$ | (11) | Level of unit profit $\left(L_3\frac{di_3}{dt}\right)$ | (19) |  |  |
| Level of income $i_1\left(i_1R_1+L_1\frac{di_1}{dt}\right)$ | (4) | Level of income $i_2\left(i_2R_2+L_2\frac{di_2}{dt}\right)$ | (12) | Level of income $i_3\left(i_3R_3+L_3\frac{di_3}{dt}\right)$ | (20) |  |  |
| Price level $-(E_1)$ | (5) | Price level $-(E_2)$ | (13) | Price level $-(E_3)$ | (21) | Price level $-(E_4)$ | (26) |
| Rate of change in stock flow ($i_{C_1}$) | (6) | Rate of change in stock flow ($i_{C_2}$) | (14) | Rate of change in stock flow ($i_{C_3}$) | (22) |  |  |
| Induced Investment ($I_1$) | (7) | Induced Investment ($I_2$) | (15) | Induced Investment ($I_3$) | (23) |  |  |
| Autonomous Investment ($G_1$) | (8) | Autonomous Investment ($G_2$) | (16) | Autonomous Investment ($G_3$) | (24) |  |  |

| Banking Organ (BK) | | National Income (Y) | |
| --- | --- | --- | --- |
| Item | Terminal | Item | Terminal |
| Rate of interest $-(Ec_b)$ | (27) | Rate of change in national income (Y) | (30) |
| Rate of change in monetary flow to save $(i_{e_b})$ | (28) | Rate of change in consumption (C) | (31) |
| Rate of change in monetary flow to invest $(i_P V i_1 - 3)$ | (29) | Rate of change in saving (S) | (32) |

NOTE.—The items carrying (−) are to be measured in reciprocal order.

For example, an analogous illustration of such a national economic phenomena that a sudden change in the rate of change in the demand for consumer goods due to a certain exogenetic incentive tends to bring about a variation in the price level in various forms according to existing conditions, can be obtained by connecting an oscilloscope or automatic recorder to the terminal 26 and performing controls on the potentiometer $Rcr_4$ in such magnitude and velocity as assumed as to the variation in the rate of change in the demand; viz. then a curve showing the variation in the voltage $E_4$ will be shown on the oscilloscope or recorder and various forms of curves will be shown as the condition in consideration differs.

Furthermore, measurements on various effects which are brought on the other parts of the national economic system by such a variation can also be made by using any of the terminals 1 to 32, inclusive.

Thus, the experimental measurements on effects which are brought by one or more economic quanta on the others can be made by the equipment, and it is also possible to make experimental measurements under various different conditions by operating the adjustors which are mentioned in Table 2, viz. for instance, in the measurements as for the sudden variation in the rate of change in demand as explained above, various forms of variation in the voltage $E_4$ might be observed as any of values of the capacitances $C_1$, $C_2$, $C_3$, inductances $L_1$, $L_2$, $L_3$, $L_4$, resistances in the potentiometers $Racc_1$, $Racc_2$, $Racc_3$, $Rsc$, etc. differs or differ respectively. This proves, on the other hand, that experimental researches on national economic policies can be carried out by the equipment, as such operations can be regarded as the experiments on functional relations in the national economy, being made from a political point of view by setting the artificially controllable economic elements on various possible positions.

(H) *Examples of designs on the insulated couplers AT, BT and CT*

Fig. 5 shows an example of design on the insulating coupler AT. Referring to Fig. 5, $V_5$ is a pentagrid vacuum tube, of which No. 1 grid serves for oscillating a certain high frequency current and of which No. 3 grid serves for controlling amplitude of such oscillation in a certain range in proportion to the grid potential thereon which is kept positive with respect to the point E; $VR_1$ is a variable resistor for setting the variation range of voltage to be applied to the No. 3 grid; $C_5$ is a by-pass condenser; $R_5$ is a grid resistor for the No. 1 grid; $C_7$ is a coupling capacitor for the No. 1 grid; $R_6$ is a resistor for keeping the No. 3 grid negatively biased and $C_9$ is a by-pass condenser; $R_7$ is a resistor for keeping Nos. 2 and 4 grids at an appropriate positive potential and $C_{10}$ is a by-pass condenser used therewith; $R_8$ indicates a resistor for developing high frequency output at the anode circuit; $L_5$ and $C_8$ designate inductance and capacitance respectively for the high frequency oscillation tuning.

$V_6$ is also a pentagrid vacuum tube, of which No. 3 grid is excited with high frequency voltage being supplied from the vacuum tube $V_5$ through a coupling capacitor $C_{11}$ and of which No. 1 grid is kept at the same potential as at the anode of the vacuum tube $V_7$, of which potential is kept positive with respect to the point E and varies proportional to the voltage being applied to the grid thereof in a certain range. High frequency output current in the anode circuit of the vacuum tube $V_6$ varies proportional to the voltage being applied to the No. 1 grid thereof in a certain range, and therefore, the high frequency output current in the anode circuit of the vacuum tube $V_6$ varies proportional to the voltage being applied to the grid of the vacuum tube $V_7$ in a certain range. As the anode voltage of the vacuum tube $V_7$ is supplied through a resistor $R_{13}$, the lower grid voltage of the vacuum tube $V_7$ brings the higher No. 1 grid voltage to the vacuum tube $V_6$, accordingly the more high frequency output current in the anode circuit of the vacuum tube $V_6$. $R_{10}$ is a resistor for keeping the No. 1 grid of the vacuum tube $V_6$ negatively biased and $R_{11}$ is a resistor for keeping the No. 3 grid thereof also negatively biased; $C_{12}$ is a by-pass condenser and $R_9$ is a grid resistor for the No. 3 grid of the vacuum tube $V_6$; $R_{12}$ and $C_{13}$ are resistor and condenser respectively for applying a certain positive voltage to the Nos. 2 and 4 grids of the vacuum tube $V_6$; $L_6$ and $C_{14}$ are inductance and capacitance respectively for the anode tuning circuit having the same resonance frequency as by the inductance and capacitance $L_5$ and $C_8$; $VR_2$ is a variable resistor for setting variation range of the voltage being applied to the grid of the vacuum tube $V_7$; $C_6$ is a by-pass capacitor.

Thus, variation in voltage being applied to the No. 3 grid of the vacuum tube $V_5$ varies proportionally amplitude of the high frequency voltage being applied to the No. 3 grid of the vacuum tube $V_6$ and the high frequency current being produced in the anode circuit thereof accordingly. Furthermore, the variation in voltage being applied to the No. 1 grid of the vacuum tube $V_6$ varies the amplitude of the high frequency current being produced in the said anode circuit of tube $V_6$. Therefore, application of two independent voltages to the terminals A, B and C, where a voltage is applied to the terminals A and B in such a connection as the terminal A being positive and the terminal B negative, and the other voltage is applied to the terminals B and C in such a connection as the terminal B being positive and the terminal C negative, controls the amplitude of the high frequency current being developed in the anode circuit of the vacuum tube $V_6$ in proportion to the product of such two independent voltages in a certain range, viz. the high frequency voltage being developed in the said anode circuit varies in proportion to the product of these two independent voltages in a certain range.

Therefore, supervision or measurement of variations in such powers as being dissipated in a resistor X carrying a direct current $i$, of which value may vary due to a change in value of the resistance of the resistor X or to other reasons, can be made in such a way that the voltage being developed through the resistor X is applied to the terminals A and B of the insulated coupler AT, voltage being developed through another resistor X', which is connected in series with the resistor X and of which resistance value is selected negligibly low as compared with that of the resistor X, is applied to the terminals B and C, and the measurement is made on the high frequency output voltage from the vacuum tube $V_6$.

This insulated coupler is required to have such a design that the secondary circuit is insulated from the primary circuit against the flow of direct current therefrom and at the same time the output voltage is obtained in direct current at the output terminals F and D in order to be used in the circuit as shown in Fig. 3. Therefore, the high frequency output from the vacuum tube $V_6$ is delivered to the diode rectifier $V_8$ through the coupling capacitors $C_{15}$ and $C_{16}$, and the rectified output is delivered, through the resistors $R_{14}$ and $R_{15}$ and the filter condenser $C_{17}$, to the output terminals F and D, which are insulated from the input terminals A, B and C against direct current flow therefrom. In each of the stages PGP, CPG and COM in the circuit shown in Fig. 3, the insulated coupler AT is used for multiplying voltage, which is developed through the series combination of the inductance and the vacuum tube, by amperage of current flowing therethrough. For example, in the stage PGP, the input terminal A of the insulated coupler AT is connected to the power supply side or the high potential end of the inductance $L_1$ and the input terminal B is connected to the cathode of the vacuum tube $V_1$ for picking up voltage which is developed through the series combination of the inductance $L_1$ and the vacuum tube $V_1$, and the input terminal C thereof is connected to the low potential end of the cathode resistor for the vacuum tube $V_1$ as shown in Fig. 3 for picking up voltage which is proportional to amperage of the current $i_1$ which flows through this series combination; while output voltage which is proportional to the product of said multiplication is obtained at the output terminals F and D thereof. In the stages CPG and COM, the insulated coupler AT is connected to the respective series combination of the inductance and the vacuum tube ($L_2$—$V_2$, $L_3$—$V_3$) in the same way as in the stage PGP, and output voltages from these three insulated couplers are added to provide a voltage which represents a national income in economic terms and the resultant voltage is delivered to the potentiometer $Rsc$ as shown in Fig. 3.

Fig. 6 illustrates an example of the design for the insulated couplers BT and CT. Either of the insulated couplers BT and CT has no function of multiplication as in the insulated coupler AT and merely produces direct current voltage in the secondary circuit thereof in proportion to voltage being applied to the primary circuit thereof in a certain range, the secondary circuit being insulated from the primary circuit against direct current flow therefrom.

The basic designs of the insulated couplers BT and CT are quite similar ones, but the latter has a larger output capacity as compared with that of the former. Their basic design is also similar to that of the insulated coupler AT, but has no such circuits as $V_6$ and $V_7$ vacuum tubes circuits and the terminal C in the insulated coupler AT, and the similar explanations as for the insulated coupler AT are applicable to the functions of the insulated couplers BT and CT, excepting those for the said dispensed circuits. In the insulated couplers BT and CT, the anode circuit of the vacuum tube $V_5$ consists of a tuning circuit being composed of the inductance $L_6$ and capacitance $C_{14}$, of which resonance frequency is kept same as of the tuning circuit being composed of the inductance $L_5$ and capacitance $C_8$.

Although a specific embodiment of this invention has been shown and described in the forgoing, it should be understood that various modifications and/or extensions can be made therein without departing from the scope and spirit of this invention; for example, the connections of electrical circuit as well as the devices and component parts therein can be modified and/or extended in order to improve and/or develop such electro-analog model equipment of national economic system, so as to make more complete the electro-analog descriptions of national economic phenomena.

What is claimed is:

1. An electro-analog device for a national economic system comprising first means for representing the productivity of a capital goods production group, of a consumer's goods production group and of a trading group as separate and variable electrical quantities which are inter-dependent; second means for totalling the electrical quantities to provide a total electrical quantity representing the total productivity and for dividing the total electrical quantity into two subtotal electrical quantities respectively representing savings and consumption; third means coupling said second and first means to influence the productivity representations in accordance with the subtotal electrical quantity representing consumption; and fourth means coupled to said second means for receiving and storing the subtotal electrical quantity which represents savings, said fourth means being coupled to said first means and distributing the stored subtotal electrical quantity to said first means as investment for controlling the productivity representations therein.

2. An electro-analog device for a national economic system as claimed in claim 1 wherein said third means is coupled to said fourth means for partially controlling the distribution of the stored subtotal electrical quantity in accordance with consumption.

3. An electro-analog device for a national economic system as claimed in claim 2 wherein said first means comprises a capital goods device, a consumer's goods device and a trading group device; each of said devices comprising resistance means providing a control for the magnitude of the electrical quantity representing the productivity therein, inertia means coupled to said resistance means providing a first suplementary control for the magnitude of the electrical quantity, and storage means coupled to said resistance means for storing portions of the electrical quantity in accordance with which storage said storage means provides a second supplementary control for the magnitude of the electrical quantity, said resistance means being coupled to said second means for supplying the electrical quantity representing productivity and further being coupled to said fourth means whereby the resistivity of said resistance means is controlled to control the magnitude of the electrical quantity.

4. An electro-analog device for a national economic system as claimed in claim 3 wherein said second means comprises a potentiometer for providing the subtotal electrical quantities representing savings and consumption.

5. An electro-analog device for a national economic system as claimed in claim 4 comprising direct current isolating means coupled to and isolating said first, second and fourth means from each other.

6. An electro-analog device for a national economic system as claimed in claim 5 wherein said resistance means is a vacuum tube comprising an anode, a cathode and a grid; said inertia means being an inductor coupling said anode to said direct current isolating means coupled between said first and second means; said storage means being a capacitor coupled to said cathode; and further comprising an electrical power source coupled to said inductor and said capacitor; said grid being coupled by said direct current isolating means to said fourth means so that the anode resistance of said vacuum tube is varied in accordance with the distribution of the subtotal electrical quantity representing savings, the distribution representing investment, the current passing through said vacuum tube as controlled by the action of said inductor, capacitor and grid representing productivity.

7. An electro-analog device for a national economic system as claimed in claim 6 wherein said third means comprises a vacuum tube coupled to said potentiometer, an inductor coupling said vacuum tube to the capacitor of said trading group device and a winding inductively coupled to said inductor, said consumer's goods and trading group devices each comprising windings inductively coupled to the associated of said inductors; said fourth means comprising a savings capacitor to receive and store the subtotal electrical quantity representing savings and distributing vacuum tubes corresponding to said capital goods, consumer's goods and trading group devices, said distributing vacuum tubes being coupled to said savings capacitor and respectively to the windings of said consumer's and trading group devices and of said third means whereby said distributing vacuum tubes are controlled to distribute the subtotal electrical quantity representing savings via said direct current isolating means to the grids of the vacuum tubes in said capital goods, consumer's goods and trading groups devices; and means to couple the latter said devices to make their operation interdependent.

8. An electro-analog device for a national economic system as claimed in claim 7 comprising potentiometers for coupling said windings to said distributing vacuum tubes to vary the control therebetween.

9. An electro-analog device for a national economic system as claimed in claim 8 comprising potentiometers coupled to the grids of the vacuum tubes in said capital goods, consumer's goods and trading group devices for varying the control thereupon.

10. An economic unitary group analog device which is extensible stage by stage for representing a multi-stage economic production system, comprising a capacitor, an electrical power source, an inductor and a vacuum tube connected in series with said electrical power source to form a controllable D.C. dynamic dropper circuit, said capacitor being connected to the vacuum tube, and provided with output terminals for the indication of voltage due to electrical charge in said capacitor, current flow to and from said capacitor, voltage induced by said inductor, voltage developed between anode and cathode of said vacuum tube and the anode current of said vacuum tube; said vacuum tube comprising a grid, an anode coupled to said inductor and a cathode coupled to said capacitor, and means to vary the bias on said grid in accordance with investment; said capacitor storing electrical energy to represent inventory, said inductor providing electrical inductance to represent profit level and production inertia, and said vacuum tube controlling the D.C. anode resistance thereof to represent control of productivity.

References Cited in the file of this patent

Radio Engineer's Handbook (Terman), 1943, page 374.

Smith and Erdley: "An electronic Analogue for an Economic System," Electrical Engineering, vol. 71, No. 4, pp. 362–366.

Smith: "Economic Analogs," Proceedings of the I.R.E., vol. 41, No. 10, pp. 1514–1519.